United States Patent [19]
Lindberg

[11] Patent Number: 5,339,704
[45] Date of Patent: Aug. 23, 1994

[54] SCREW LIFT

[75] Inventor: Ulf Lindberg, Skelleftea, Sweden

[73] Assignee: Alimkak AB, Skelleftea, Sweden

[21] Appl. No.: 688,537

[22] PCT Filed: Dec. 13, 1989

[86] PCT No.: PCT/SE89/00729
§ 371 Date: Dec. 8, 1992
§ 102(e) Date: Dec. 8, 1992

[87] PCT Pub. No.: WO90/06894
PCT Pub. Date: Jun. 28, 1990

[30] Foreign Application Priority Data

Dec. 21, 1988 [SE] Sweden .............................. 7794584.3

[51] Int. Cl.⁵ .................. F16H 25/24; B66B 11/04
[52] U.S. Cl. ..................... 74/89.15; 74/459; 182/141; 187/25
[58] Field of Search ............... 74/89.15, 459; 187/25; 182/141; 414/921

[56] References Cited

U.S. PATENT DOCUMENTS

| | | | |
|---|---|---|---|
| 2,527,897 | 10/1950 | Todd | 187/25 |
| 4,279,329 | 7/1981 | Gehron | 187/25 |
| 4,747,320 | 5/1988 | Nilsson | 187/25 X |
| 4,768,621 | 9/1988 | Kunii | 187/25 |
| 4,919,236 | 4/1990 | Karlsson et al. | 187/25 |

Primary Examiner—Allan D. Herrmann
Attorney, Agent, or Firm—Oblon, Spivak, McClelland, Maier & Neustadt

[57] ABSTRACT

In a screw lift the lift cage is carried by a drive nut rotatably provided on an essentially upright screw, the lift cage carrying a bearing means and a drive means for the nut. The screw is supported by several supporting braces attached thereto along the length thereof. The nut has the shape of a spiral having turns, the pitch and axial thickness of which are adapted to the distance between the braces and the dimensions of these in the length direction of the screw so as to enable the nut to pass freely past the braces by passing between the turns of the nut during the passage.

14 Claims, 4 Drawing Sheets

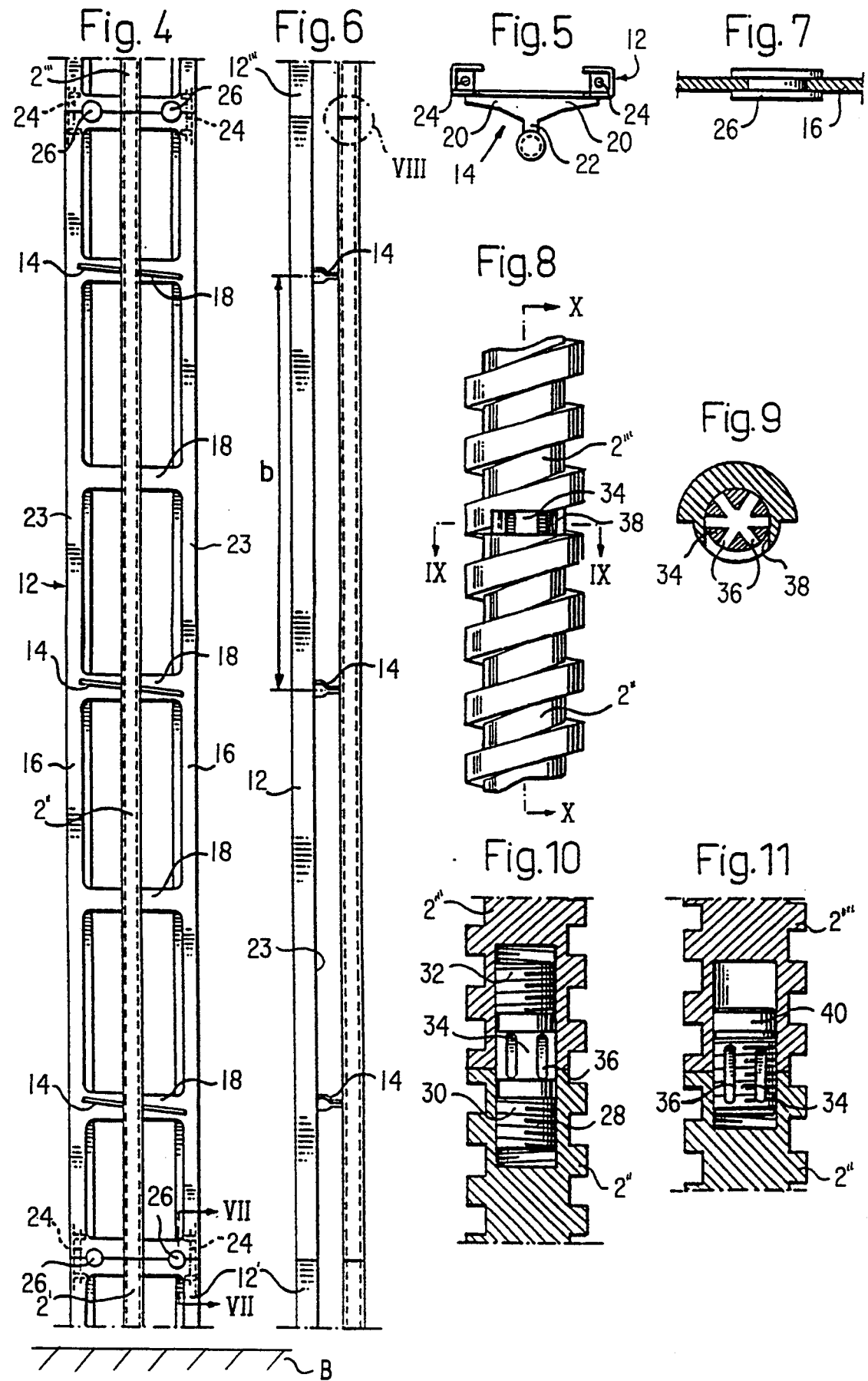

SCREW LIFT

BACKGROUND OF THE INVENTION

1. Field of the Invention

The present invention relates to an arrangement in a screw lift, in which the lift cage or similar is carried by a nut rotatably provided on an essentially upright screw, the lift cage carrying a bearing means and a drive means for the nut.

2. Discussion of the Related Art

Conventionally, in such screw lifts, the screw hangs from an attachment at the uppermost end of a guide rod. This design is limited with respect to its lifting height, since the dead weight of the screw plus the lift cage with its load shall be carried by the screw. Furthermore the guide rod must be designed so as to be able to carry the above mentioned load plus dynamic additional loads at catching and braking operations.

SUMMARY OF THE INVENTION

The purpose of the invention is to provide, in a screw lift of the kind indicated above, an arrangement that admits an unlimited lifting height.

The above mentioned purpose has been attained in that, according to the invention, the screw is supported by several supporting braces attached thereto along the length thereof, and in that the nut has the shape of a spiral having turns, the pitch and axial thickness of which are adapted to the distance between the braces and the dimension of these in the length direction of the screw so as to enable the nut to pass freely past the braces by these passing between the turns of the nut during the passage.

The invention makes possible location of the screw resting with its lower end on a bed, the task of the braces being to support the screw against breaking under the moment imposed by the lift cage plus load. The task of a guide arranged in association with the screw is limited to guidance of the lift cage and taking up moments via lift cage guiding rolls running on the guide.

DESCRIPTION OF THE DRAWINGS

The invention will now be described more closely below with reference to some embodiments which are shown schematically on the drawings, of which FIG. 1 a side view of screw and nut together with the driving portion in one embodiment of a screw lift according to the invention;

FIGS. 4–6 in an elevational view, an end view and a side view, respectively, illustrate a section of a screw used with a screw lift according to the invention, the screw being attached to a guide by means of supporting braces spaced along the length of the screw;

FIG. 7 shows a view in the direction of arrows VII—VII in FIG. 5 of a detail of the screw and guide combination;

FIG. 8 in a heavily enlarged scale shows the encircled portion of the screw designated VIII in FIG. 6;

FIG. 9 shows a sectional view in the direction of arrows IX—IX in FIG. 8;

FIGS. 10 and 11, respectively, in the direction of arrows X—X in FIG. 8 show two embodiments of a connecting element included in FIG. 8;

DESCRIPTION OF THE PREFERRED EMBODIMENTS

Figure 1:
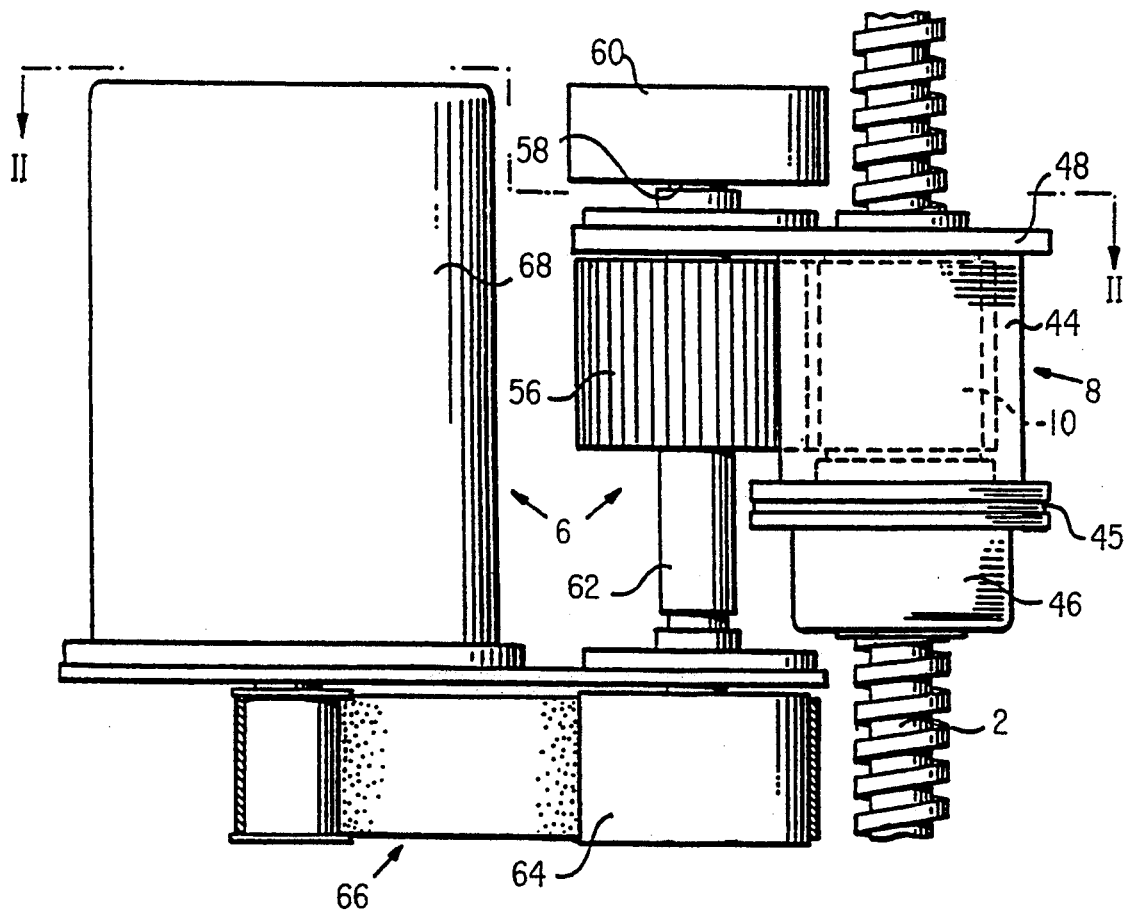

In the different Figures the same or similarly acting portions have obtained the same reference characters.

In the Figures the screw of a screw lift is designated 2, the screw lift being of the kind where the screw in an essentially upright position carries a lift cage which is indicated at 4 in some of the Figures. As noted in FIG. 4, the screw 2 with its lower end rests upon a base B. In a way to be described more closely below, the lift cage 4 carries a drive means, generally designated 6, and a bearing means, generally designated 8, for a nut 10 running on the screw 2.

The screw 2 is partitioned in mutually interconnected screw sections 2', 2'', 2''' (FIGS. 4 and 6). Each screw section 2', 2'' and 2''', respectively, is connected with a corresponding guide section 12', 12'' and 12''', respectively, of a guide 12 by means of supporting braces 14. Each guide section is a plane and essentially elongated frame work structure of U-shaped side profile members 16 interconnected by means of transverse webs 18.

The braces 14 are distributed along the length of the screw 2, preferably so as to be somewhat more closely appearing in connection with the joints between the sections. In the example shown in FIGS. 4–6 three braces 14 are arranged for each screw section 2', 2'', 2'''. In a transverse section each brace 14 is essentially plate shaped with a low elongated base at 20, which is attached, e.g. by means of welding, to a corresponding one of the transverse webs 18 extending along the whole length thereof. From the base 20, in the middle thereof, an arm 22 is extending perpendicularly outwardly, at the end of which the screw is attached, e.g. by means of welding or clamping as will be described more closely below. The base 20 of the braces 14 extends, of reasons which will appear from below, under an angle with the screw 2, which corresponds to the pitch of the screw.

The guide sections 12', 12'' and 12''' are interconnected at their ends by means of screw joints indicated at 24. The guide mast is guided at the joints by means of special guide buttons 26 so that the panel surfaces of the guide sections are smoothly guided at the joint and a smooth running race 23 for each of the guide wheels, to be described below, of the lift cage is obtained. Such a guide button 26 is shown more in detail in FIG. 7.

FIG. 8 on an enlarged scale shows the region of the joint between the two screw sections 2'' and 2'''. According to the embodiment shown in FIG. 10 the screwing together of the screw sections is carried through end to end by means of a screw 28 of the rigging screw type with oppositely threaded end portions 30 and 32, respectively, engaging correspondingly threaded holes in the end of the screw 2'' and 2''', respectively. A mid portion 34 of the rigging screw 28 has through holes 36 for receiving a special key during the mounting operation, c.f. FIG. 9. The portion 34 is then reachable through an indentation 38 in the screw 2'''.

In the embodiment of FIG. 11 a special screw is used for the joining together of the screw sections, one end 40 of which is attached in a hole in the end of the screw 2''' and the other end of which is threaded into a threaded hole in the end of the screw 2''. The interconnection screw shown in FIG. 11 likewise has a mid portion 34, 36 of the same shape and function as in the embodiment shown in FIG. 10, and being reachable through an indentation corresponding to the indentation 38. With its side remote from the screw 2 the guide 12 may be mounted on a wall or similar of a building or construction, in which the lift shall be used, c.f. the attachment plate indicated at 41 in FIG. 12 as well as the screw joints indicated there at 41a.

The nut 10 has the shape of a spiral having turns, the pitch and axial thickness a (FIG. 3) of which are adapted to the distance b (FIG. 6) between the braces 14 and the dimension c (FIG. 3) of these in the direction of the screw 2, so as to allow the nut 10 to pass freely past the braces 14 by these passing between the turns of the nut during the passage. More particularly, this is also obtained by the distance b being an even multiple of the pitch of the turns of the nut 10 and by the above mentioned location of the base 20 at an angle corresponding to said pitch.

Figure 3:
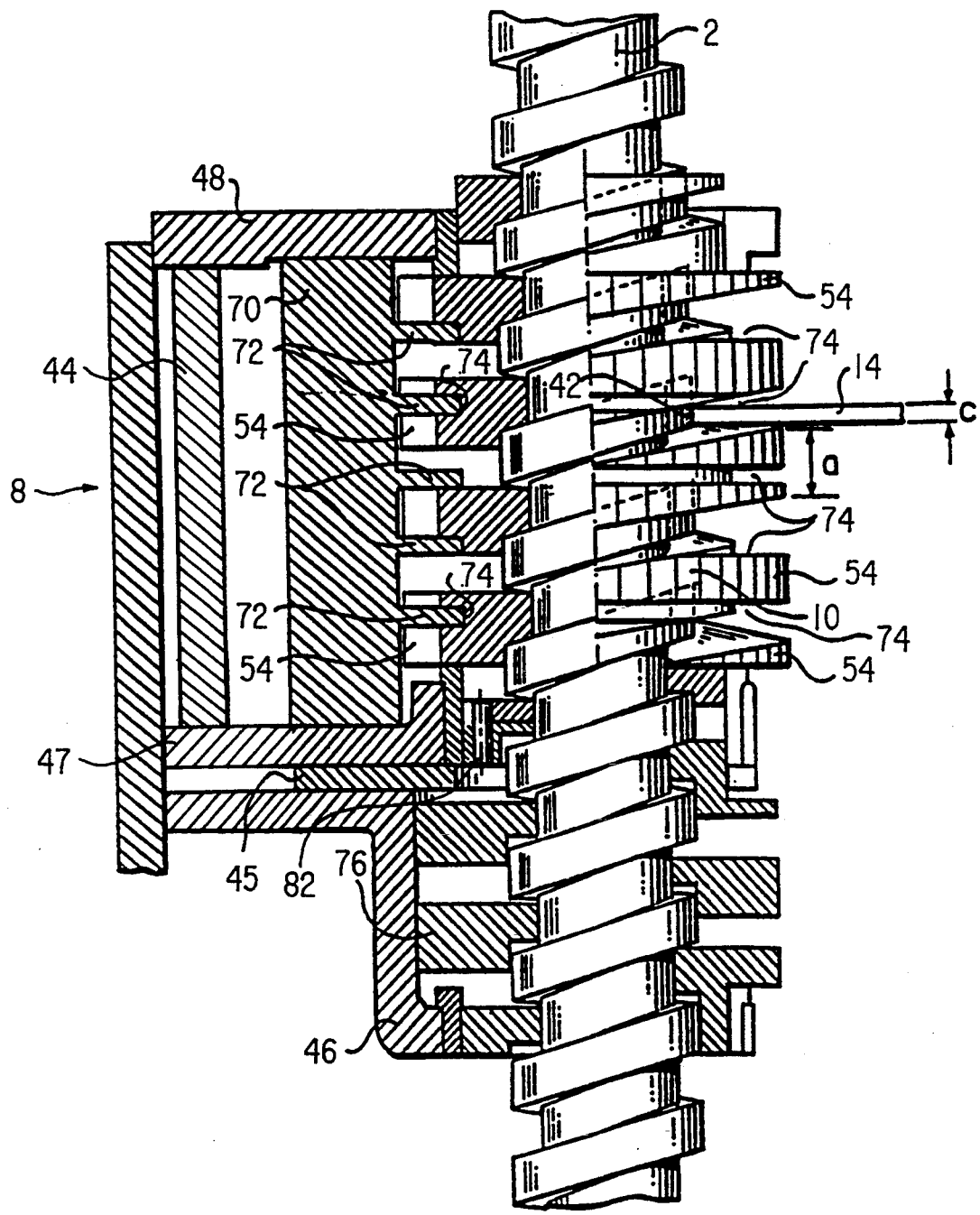
FIG. 3 is a partly sectional view essentially in the direction of III—III in FIG. 2.

In FIG. 3 a method for attaching the braces 14 to the screw 2 is indicated at 42, viz. by welding.

Figure 2:
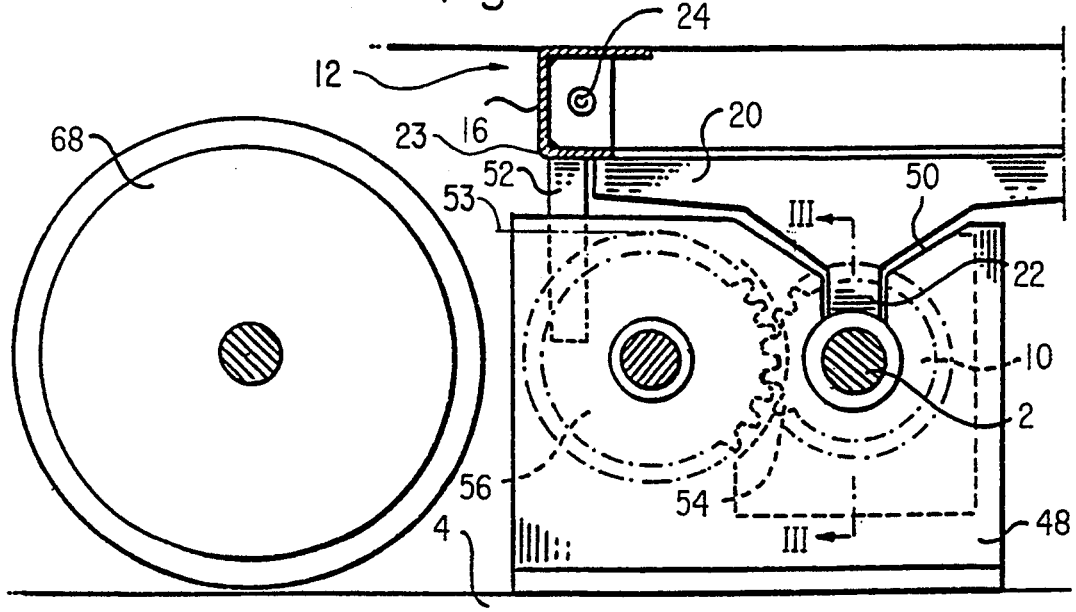
FIG. 2 is a view in the direction of arrows II—II in FIG. 1.

In the embodiment shown in FIGS. 1 and 2 the bearing means 8 for the nut 10 includes an upper bearing house portion 44 having an indentation, not shown, for allowing passage of the braces 14 during movement of the nut along the screw. The bearing means 8 also includes a lower bowl shaped bearing house portion 46. The bearing house portions 44, 46 are carried on the lower side of a plate 48 which is directly or indirectly attached to the lift cage 4 in a way not shown, e.g. by means of screw joints. The plate 48 includes an indentation 50 adapted to the shape of the braces 20, 22 for allowing passage of these.

Figure 12:
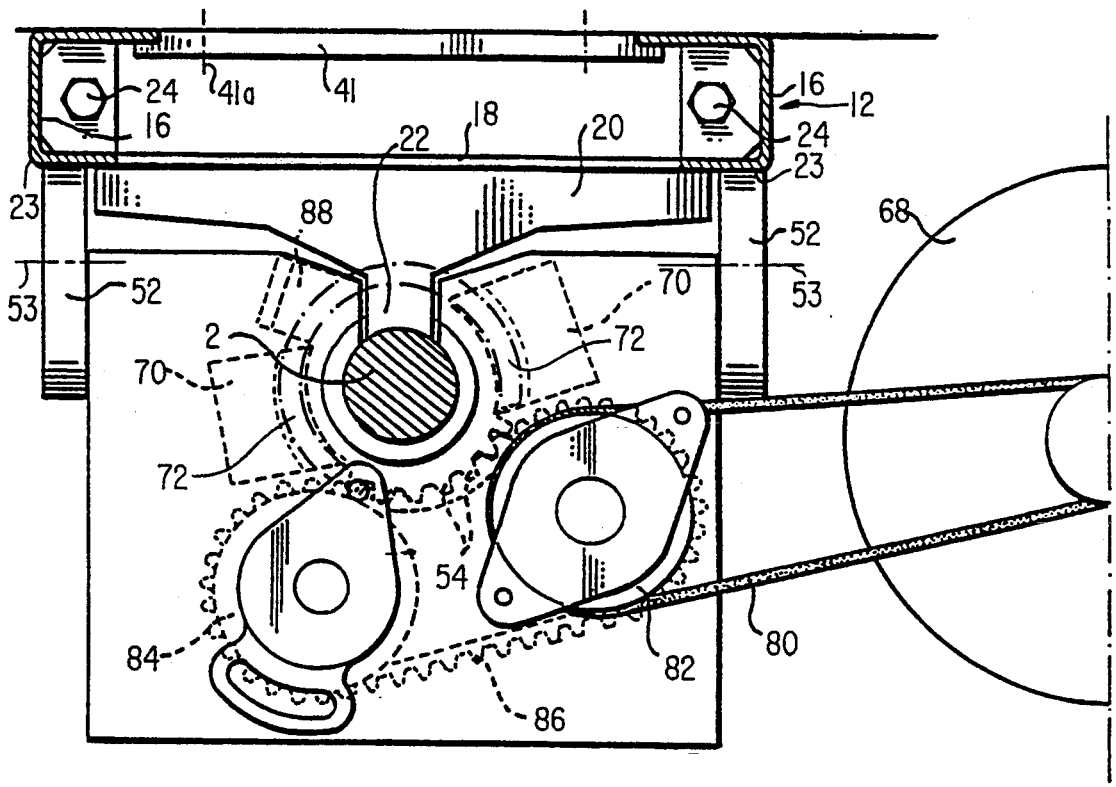
FIG. 12 in a similar view as in FIG. 2 illustrates an alternative driving method for the drive nut.

In a way not shown the lift cage 4 furthermore carries a number of support wheels 52, each having an axis 53 and of which one is indicated in FIG. 2 and two are indicated in FIG. 12. The support wheels run on the side of the profile members 16 facing the screw. Via the wheels 52 the guide carries moments from the lift cage and structure connected thereto.

The nut 10 has outer teeth 54 by means of which the nut engages a driving tooth wheel 56 which is rotatably supported in the plate 48. An upper shaft pin 58 connected to the tooth wheel 56 carries a brake drum 60 and a lower shaft pin 62 connected to the tooth wheel 56 carries a belt pulley 64. The belt pulley 64 forms part of a belt drive, generally indicated at 66, by means of which the tooth wheel 56, and thereby the nut 10, is driven by an electric motor 68. The drive means 6 formed by the elements 56-68 is suspended on the lift cage 4 and structure connected thereto in a way not shown or described. The man of the art realizes how to carry this through in practice.

The bearing means for the nut 10 will now be described in more detail with reference to FIG. 3. In FIG. 3, the parts 44, 48, 70 and the plate 47 are joined to each other by suitable connections. For example, the parts 48 and 70 can be bolted to each other, the parts 47 and 70 can be welded, while the parts 46 and 47 may be bolted to each other. Other connection means are also known to those skilled in the art.

The nut 10 is surrounded by two bearing blocks 70 of which one is shown in section in FIG. 3 and two are indicated in FIG. 12. More particularly, the bearing blocks, which are carried in the house portion 44, may surround the nut to an extent allowed by the free space available therefor at the circumference of the nut. This implies that the space for threaded engagement between the tooth wheel 56 and the nut 10 must be left free, as well as the space where the nut passes the braces 14. The surface of the bearing blocks 70 intended for cooperation with the nut 10, and forming part of a cylinder surface, has a number of ribs 72 extending in radial planes and engaging indentations 74 in the outer periphery of the nut 10 correspondingly extending in radial planes. The lower surfaces of the ribs 72 and the facing surfaces of the indentations 74 form cooperating bearing surfaces by means of which the lift cage and the structure associated therewith is carried by the nut.

By virtue of the fact that the nut, in the way described above, is supported on an enlarged surface, it will not be compressed under load, but distributes the weight and load of the lift cage to the screw over its whole length. By its engagement with the teeth 54 the tooth wheel 56 acts as an arresting means for preventing that the turns of the nut 10 are mutually twisted.

In the lower bearing house portion 46 a safety nut 76 is arranged which is likewise in engagement with the screw 2. Normally it does not transfer any load but is freely co-running when the lift is operated. If the drive nut 10 fails, the load will be carried by the safety nut 76 via a friction lining 45 arranged between the house portions 44 and 46, making that the lift stops (self-braking). If a pitch is chosen for the nut and screw combination which implies self-braking, the friction lining is not needed. As an alternative the lift can be provided with a catch apparatus, implying that the drive need not be self-braking and a higher velocity of the lift may be allowed.

In the lower end of the nut a pin 82 is inserted. The pin extends into a bore in the upper end of the safety nut 76. There is a clearance between the nut and the safety nut. Normally there is no axial load on the safety nut since the load is taken up by the ribs 72 such that the safety nut rotates with the nut without being loaded, i.e., it rotates freely. However, if a breakage occurs, e.g., of the ribs so that the nut no longer will be supported by them, then the weight of the lift cage will be transmitted from the nut to the top of the safety nut. Then, the safety nut will be pressed against the friction lining 45 to thereby stop the lift cage from further movements.

The pitch angle of the screw can be chosen so as to make the drive nut self-braking, by giving the screw a large diameter. It is also possible to choose a smaller diameter for the screw and a greater pitch and let a brake make the drive self-braking. An example of this is the brake drum 60 in FIG. 1. The brake is then designed so as to brake less hard during drive upwardly as compared with downward movement.

An example of such a brake arrangement is also shown in FIG. 12, which also illustrates an alternative to the tooth wheel drive used in the embodiment according to FIGS. 1 and 2. Here the motor 68 drives a belt pulley 82 via a belt drive 80. Over the belt pulley 82 and a co-running wheel 84 located at a distance therefrom, a tooth belt 86 runs, which engages the teeth 54 of the nut 10 with a long portion of its length. Apparently a longer driving contact surface is obtained here, as compared with the embodiment of FIGS. 1 and 2 with the engagagement between the tooth wheel 56 and nut 10.

The brake arrangement includes a brake block 88 having a surface of engagement with an area free of teeth, not shown in FIG. 12, on the periphery of the nut 10. More particularly, the brake block 88 does not act diametrically against the engagement surface of the nut 10, but under an angle thereat, implying that the brake block 88 exerts a greater braking force during clockwise rotation of the nut 10, as seen in FIG. 12, as compared with rotation in the other direction. The clockwise rotation then corresponds to downward movement of the lift. Closer details of the mechanism of engagement of the brake block 88 do not form part of the invention and need therefor not be described here. The realization thereof is, however, evident to the man of the art.

In FIG. 12 also the bearing blocks of the nut are indicated, which, more particularly, here are two essentially mutually opposite bearing blocks 70. Of course, their available space is limited by the fact that the wheels 82 and 84 and the brake blocks 88 occupy space.

Figure 14:
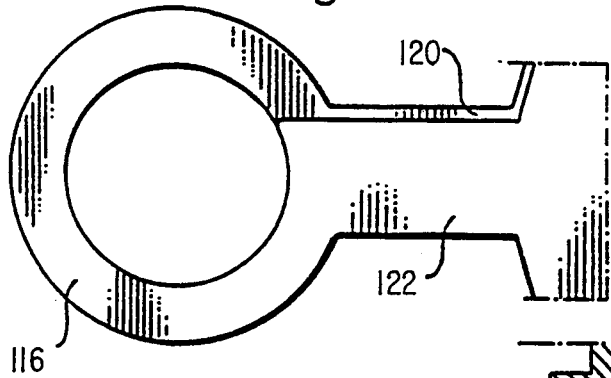
FIG. 14 shows the brace according to FIG. 13 in a plan view.
Figure 13:
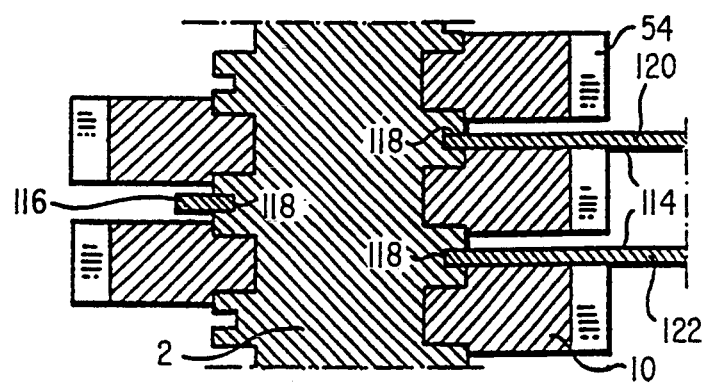
FIG. 13 in an axial section through a portion of the nut in a further embodiment of the invention illustrates an alternative design of the supporting braces for the screw.

In FIGS. 13 and 14 an alternative form of attachment for the attachment braces, here designated 114, is shown. More particularly, each attachment brace 114 here forms a loop 116 enclosing the screw 2 and extending in a grove 118 in the ridge of the screw 2. The loop 116 extends from two arms 120, 122, arranged in parallel above each other, corresponding to the arm 22 of the braces 14 and passing over into each a base portion having a shape corresponding to the shape of the base portion 20 of the braces 14.

I claim:

1. An arrangement in a screw lift, in which a lift cage is carried by a drive nut rotatably provided on an essentially upright screw, the lift cage carrying a bearing means and a drive means for the nut, wherein the screw is supported by several supporting braces attached thereto along a length thereof, and the nut has the shape of a spiral having turns which have a pitch and an axial thickness which are adapted to a distance between the braces and a dimension of the braces in a length direction of the screw so as to enable the nut to pass freely past the braces and the braces to pass between the turns of the nut during the passage.

2. An arrangement according to claim 1, wherein the screw is partitioned into sections connectable to each other end to end.

3. An arrangement according to claim 2, further comprising a guide having a plurality of guide sections, wherein the screw comprises a plurality of screw sections and each screw section by means of the braces is attached to an associated guide section which is likewise connectable to other guide sections.

4. An arrangement according to claim 3, wherein the guide has running races for guide wheels intended to carry a load of the lift cage and associated structure.

5. An arrangement according to any one of the preceding claims, wherein an outer periphery of the nut is provided with teeth intended for engagement with a drive element having teeth.

6. An arrangement according to claim 5, wherein the teeth of the nut extend at least over a considerable portion of the whole length of the nut.

7. An arrangement according to claim 6, wherein the nut between its ends has at least one bearing surface intended for carrying axial forces.

8. An arrangement according to claim 7, wherein said at least one bearing surface is formed by one side of a groove, said one side extending in a periphery of the nut in a plane perpendicular to the axial direction.

9. An arrangement according to claim 8, wherein the nut is supported in bearing blocks having, in a wall thereof facing the nut, a bearing surface arranged for engagement with each bearing surface of the nut.

10. An arrangement according to claim 9, wherein the bearing blocks extend along the length of the nut and have a plurality of ribs extending in radial planes and being intended for engagement with each of a like plurality of the grooves.

11. An arrangement according to claim 10, wherein the screw with its lower end is supported on a base.

12. An arrangement according to claim 1, further comprising a brake device for making the drive means self-braking.

13. An arrangement according to claim 1, further comprising a brake device for acting more forcefully at movement downwards than at upwards movement.

14. An arrangement according to claim 11, further comprising a safety nut located below the drive nut and having the shape of a spiral with the same characteristics as the drive nut.

* * * * *

UNITED STATES PATENT AND TRADEMARK OFFICE
CERTIFICATE OF CORRECTION

PATENT NO. : 5,339,704
DATED      : August 23, 1994
INVENTOR(S) : Ulf LINDBERG

It is certified that error appears in the above-indentified patent and that said Letters Patent is hereby corrected as shown below:

On the title page, Item [73], the Assignee should read:

--Alimak AB, Skelleftea, Sweden--

Signed and Sealed this

Twenty-fourth Day of January, 1995

Attest:

BRUCE LEHMAN

*Attesting Officer*     *Commissioner of Patents and Trademarks*